United States Patent
Ho et al.

(10) Patent No.: US 11,804,335 B2
(45) Date of Patent: *Oct. 31, 2023

(54) POWER STORAGE DEVICE AND POWER STORAGE DEVICE ASSEMBLY STRUCTURE

(71) Applicant: WAYS TECHNICAL CORP., LTD., Taoyuan (TW)

(72) Inventors: Wen-Hsien Ho, Taoyuan (TW); Pei-Yi Chien, Taoyuan (TW)

(73) Assignee: WAYS TECHNICAL CORP., LTD., Taoyuan (TW)

( * ) Notice: Subject to any disclaimer, the term of this patent is extended or adjusted under 35 U.S.C. 154(b) by 304 days.

This patent is subject to a terminal disclaimer.

(21) Appl. No.: 17/116,675

(22) Filed: Dec. 9, 2020

(65) Prior Publication Data

US 2021/0183587 A1 Jun. 17, 2021

(30) Foreign Application Priority Data

Dec. 13, 2019 (TW) .................................. 108145888

(51) Int. Cl.
*H01G 11/76* (2013.01)
*H01G 11/26* (2013.01)
(Continued)

(52) U.S. Cl.
CPC ............. *H01G 11/76* (2013.01); *H01G 11/08* (2013.01); *H01G 11/10* (2013.01); *H01G 11/26* (2013.01);
(Continued)

(58) Field of Classification Search
CPC .......... H01G 11/10; H01G 11/12; H01G 11/76
See application file for complete search history.

(56) References Cited

U.S. PATENT DOCUMENTS

| 11,381,098 B2 * | 7/2022 | Ho ........................ H02J 7/0063 |
| 2011/0075322 A1 * | 3/2011 | Kuriki .................... H01G 11/10 361/502 |

(Continued)

FOREIGN PATENT DOCUMENTS

| TW | 201727683 A | 8/2017 |
| TW | M598511 U | 7/2020 |

OTHER PUBLICATIONS

Search Report dated Oct. 14, 2020, for corresponding TW Application No. 108145888.

*Primary Examiner* — Eric W Thomas
(74) *Attorney, Agent, or Firm* — Muncy, Geissler, Olds & Lowe, P.C.

(57) ABSTRACT

A power storage device has a first power storage unit, a second power storage unit, a third power storage unit, and a fourth power storage unit. The power storage device is provided with a common electrode being integrated molding to make the first power storage unit and the second power storage unit connected in series, the third power storage unit and the fourth power storage unit connected in series, the first power storage unit and the third power storage unit connected in parallel, and the second power storage unit and the fourth power storage unit connected in parallel, so inside of the power storage device can have high potential and high capacitance, and avoid the problem of increasing the overall impedance caused by the conventional welding process. Further, the power storage device uses both surfaces of the common electrode at the same time to save electrode material.

17 Claims, 9 Drawing Sheets

(51) Int. Cl.
*H01G 11/10* (2013.01)
*H01G 11/08* (2013.01)
*H01M 4/14* (2006.01)
*H01M 10/06* (2006.01)
*H01G 11/80* (2013.01)
*H01G 11/82* (2013.01)
*H02J 7/34* (2006.01)

(52) U.S. Cl.
CPC ............ *H01G 11/80* (2013.01); *H01G 11/82* (2013.01); *H01M 4/14* (2013.01); *H01M 10/06* (2013.01); *H02J 7/34* (2013.01)

(56) References Cited

U.S. PATENT DOCUMENTS

2011/0286149 A1* 11/2011 Lee .................. H01G 11/82
                                                                      29/25.03
2017/0365421 A1* 12/2017 Horikawa .............. H01G 11/74
2019/0115627 A1* 4/2019 Rendall .................. H01G 11/72

* cited by examiner

POWER STORAGE DEVICE AND POWER STORAGE DEVICE ASSEMBLY STRUCTURE

BACKGROUND

Technical Field

The present disclosure relates to a power storage device, in particular to a power storage device which at least one integrated molding common electrode is used to achieve parallel and series connection of inside of the power storage device, and a power storage device assembly structure formed by connecting multiple power storage devices in series.

Related Art

A power storage device refers to all components and devices with a power storage function, such as lithium-ion batteries, nickel-metal hydride batteries, lead storage batteries, lithium-ion capacitors, and electric double-layer capacitors (EDLCs). In recent years, accompanying with the development of portable information terminals such as mobile phones or smart phones, laptop personal computers, portable music players, digital cameras and other electronic devices, medical equipment, hybrid vehicles, electric vehicles or plug-in hybrids, especially due to the miniaturization of mobile devices or the limitation of installation space, miniaturization of power storage devices is required, as well as high potential and high capacitance of power storage devices. Among the many types of power storage devices, supercapacitors are also included, and the supercapacitors are EDLCs.

In order to obtain high potential or high capacitance, currently, the exteriors of multiple power storage devices are additionally soldered with conductive lines or metals (solders), so that multiple power storage devices are connected in series or in parallel. For example, connecting two supercapacitors with an upper electrode plate and a lower electrode plate in parallel is formed by electrically connecting the lower electrode plate of the supercapacitor located above and the upper electrode plate of the supercapacitor located below via welding. However, since the soldering process uses solders to electrically connect various power storage devices (such as supercapacitors), the overall impedance will increase accordingly. Especially when in order to obtain a high potential and a high capacitance at the same time, the current use of external conductive lines for series or parallel welding methods, on the contrary, leads to too many and unavoidable conductive lines, solders and solder joints, forming more impedance. In addition, obviously, the upper electrode plate and the lower electrode plate of the supercapacitor are respectively applied to one of the two surfaces of the electrode plate, in other words, the other surface is not used to make the supercapacitor, which is a waste. Further, the aforementioned parallel connection of two supercapacitors will increase the overall thickness or lengthen the overall length, which makes miniaturization difficult.

SUMMARY

The main purpose of the present disclosure is to provide a power storage device, wherein at least one integrated molding common electrode is used to achieve parallel and series connection of inside of the power storage device, so that the power storage device achieves high potential and high capacitance at the same time. Accordingly, the power storage device can use the two surfaces (top surface and bottom surface) of the common electrode at the same time, saving electrode materials and making the overall thickness thinner to meet the miniaturization of the power storage device.

To achieve the objective of the present disclosure, the present disclosure provides a power storage device, at least comprising: a first power storage unit having a first electrode, a second electrode, a first electrolyte layer and a first encapsulation, wherein the second electrode is disposed opposite to the first electrode, the first electrolyte layer is disposed between the first electrode and the second electrode, and the first encapsulation is used to encapsulate the first electrode, the second electrode and the first electrolyte layer; a second power storage unit having a third electrode, a fourth electrode, a second electrolyte layer and a second encapsulation, wherein the fourth electrode is disposed opposite to the third electrode, the second electrolyte layer is disposed between the third electrode and the fourth electrode, and the second encapsulation is used to encapsulate the third electrode, the fourth electrode and the second electrolyte layer; a third power storage unit having a fifth electrode, a sixth electrode, a third electrolyte layer and a third encapsulation, wherein the sixth electrode is disposed opposite to the fifth electrode, the third electrolyte layer is disposed between the fifth electrode and the sixth electrode, and the third encapsulation is used to encapsulate the fifth electrode, the sixth electrode and the third electrolyte layer; and a fourth power storage unit having a seventh electrode, an eighth electrode, a fourth electrolyte layer and a fourth encapsulation, wherein the eighth electrode is disposed opposite to the seventh electrode, the fourth electrolyte layer is disposed between the seventh electrode and the eighth electrode, and the fourth encapsulation is used to encapsulate the seventh electrode, the eighth electrode and the fourth electrolyte layer; wherein the first electrode and the third electrode are integrated molding, the fifth electrode and the seventh electrode are integrated molding, the second electrode and the sixth electrode are integrated molding, and the fourth electrode and the eighth electrode are integrated molding; the second electrode and the fourth electrode are electrically insulated to each other.

In one embodiment of the present disclosure, the second electrode and the sixth electrode are an electrode plate which forms a common electrode of the first power storage unit and the third power storage unit, and the first power storage unit and the third power storage unit are respectively formed on a top surface and a bottom surface of the common electrode of the first power storage unit and the third power storage unit.

In one embodiment of the present disclosure, the fourth electrode and the eighth electrode are another one electrode plate which forms a common electrode of the second power storage unit and the fourth power storage unit, and the second power storage unit and the fourth power storage unit are respectively formed on a top surface and a bottom surface of the common electrode of the second power storage unit and the fourth power storage unit.

In one embodiment of the present disclosure, the first encapsulation, the second encapsulation, the third encapsulation and the fourth encapsulation are respectively made of insulating materials In one embodiment of the present disclosure, the first electrolyte layer, the second electrolyte layer, the third electrolyte layer and the fourth electrolyte layer are respectively made of aqueous electrolytes In one embodiment of the present disclosure, the power storage device further has a first lead electrode and a second lead electrode, the first lead electrode and the second electrode are electrically connected to each other, the second lead electrode and the fourth electrode are electrically connected to each other; when the power storage device is charged or discharged, the first lead electrode, the second electrode, the sixth electrode, the third electrode and the seventh electrode have an identical electrode polarity, and the second lead electrode, the fourth electrode, the eighth electrode, the first electrode and the fifth electrode have other one identical electrode polarity; and the first lead electrode and the second lead electrode have the different electrode polarities. Therefore, the first power storage unit and the second power storage unit are connected in series, the third power storage unit and the fourth power storage unit are connected in series, the first power storage unit and the third power storage unit are connected in parallel, the second power storage unit and the fourth power storage unit are connected in parallel.

In one embodiment of the present disclosure, the first lead electrode and the second electrode are integrated molding, and the second lead electrode and the fourth electrode are integrated molding.

To achieve the objective of the present disclosure, the present disclosure provides a power storage device, at least comprising: a first power storage unit having a first electrode, a second electrode, a first electrolyte layer and a first encapsulation, wherein the second electrode is disposed opposite to the first electrode, the first electrolyte layer is disposed between the first electrode and the second electrode, and the first encapsulation is used to encapsulate the first electrode, the second electrode and the first electrolyte layer; a second power storage unit having a third electrode, a fourth electrode, a second electrolyte layer and a second encapsulation, wherein the fourth electrode is disposed opposite to the third electrode, the second electrolyte layer is disposed between the third electrode and the fourth electrode, and the second encapsulation is used to encapsulate the third electrode, the fourth electrode and the second electrolyte layer; a third power storage unit having a fifth electrode, a sixth electrode, a third electrolyte layer and a third encapsulation, wherein the sixth electrode is disposed opposite to the fifth electrode, the third electrolyte layer is disposed between the fifth electrode and the sixth electrode, and the third encapsulation is used to encapsulate the fifth electrode, the sixth electrode and the third electrolyte layer; and a fourth power storage unit having a seventh electrode, an eighth electrode, a fourth electrolyte layer and a fourth encapsulation, wherein the eighth electrode is disposed opposite to the seventh electrode, the fourth electrolyte layer is disposed between the seventh electrode and the eighth electrode, and the fourth encapsulation is used to encapsulate the seventh electrode, the eighth electrode and the fourth electrolyte layer; wherein the second electrode, the fourth electrode, the sixth electrode and the eighth electrode are integrated molding, the first electrode and the second electrode are electrically insulated to each other, and the fifth electrode and the seventh electrode are electrically insulated to each other.

In one embodiment of the present disclosure, the second electrode, the fourth electrode, the sixth electrode and the eighth electrode are an electrode plate which forms a common electrode of the first power storage unit, the second power storage unit, the third power storage unit and the fourth power storage unit, the first power storage unit and the second power storage unit are respectively formed on a left end and a right end of a top surface of the common electrode of the first power storage unit, the second power storage unit, the third power storage unit and the fourth power storage unit, and the third power storage unit and the fourth power storage unit are respectively formed on a left end and a right end of a bottom surface of the common electrode of the first power storage unit, the second power storage unit, the third power storage unit and the fourth power storage unit.

In one embodiment of the present disclosure, the power storage device further has a first lead electrode and a second lead electrode, the first lead electrode, the first electrode and the fifth electrode are electrically connected to each other, and the second lead electrode, the third electrode and the seventh electrode are electrically connected to each other; when the power storage device is charged or discharged, the first lead electrode, the first electrode, the fifth electrode, the fourth electrode and the eighth electrode have an identical electrode polarity, and the second lead electrode, the third electrode, the seventh electrode, the second electrode and the sixth electrode have other one identical electrode polarity; the first lead electrode and the second lead electrode have the different electrode polarities. Therefore, the first power storage unit and the second power storage unit are connected in series, the third power storage unit and the fourth power storage unit are connected in series, the first power storage unit and the third power storage unit are connected in parallel, the second power storage unit and the fourth power storage unit are connected in parallel.

In one embodiment of the present disclosure, the first lead electrode, the first electrode and the fifth electrode are integrated molding, and the second lead electrode, the third electrode and the seventh electrode are integrated molding.

To achieve the objective of the present disclosure, the present disclosure provides a power storage device assembly structure, the aforementioned power storage devices are connected in series with integrated molding electrodes to form the power storage device assembly structure, and the number of series connections can be gradually increased according to requirements, so that a power storage device assembly structure can have high potential and high capacitance.

To achieve the objective of the present disclosure, the present disclosure provides a power storage device assembly structure at least comprising power storage devices, and each of the power storage devices is the above mentioned power storage device, wherein the power storage devices are arranged linearly, and the adjacent power storage devices are connected in series; and "the fourth electrode and the eighth electrode of the power storage device" and "the second electrode and the sixth electrode of the adjacent power storage device" are integrated molding.

To achieve the objective of the present disclosure, the present disclosure provides a power storage device assembly structure at least comprising power storage devices, and each of the power storage devices is the above mentioned power storage device, wherein the power storage devices are arranged linearly, and the adjacent power storage devices are connected in series; and the third electrode of the power storage device and the first electrode of the adjacent power storage device are integrated molding, and the seventh electrode of the power storage device and the fifth electrode of the adjacent power storage device are integrated molding.

In the present disclosure, inside of the power storage device, at least one integrated molding common electrode is used to achieve parallel and series connection of the first power storage unit, the second power storage unit, the third power storage unit and the fourth power storage unit, without welding exterior of the power storage device for parallel and series connection, so that it can avoid the problem that the overall impedance caused by the welding process increases due to welding. In addition, in the present disclosure, the power storage devices can be connected in series within the power storage device assembly structure, and the preset potential and capacitance can be achieved. Further, the present disclosure uses a common electrode inside the power storage device, where the top surface and the bottom surface of the common electrode can be used at the same time, instead of using only the top surface of the electrode or only the bottom surface of the electrode like the conventional electrode. The power storage device of the present disclosure using the common electrode can save electrode materials, make the overall thickness thinner, and meet the miniaturization of the power storage device.

DESCRIPTIONS OF DRAWINGS

DESCRIPTIONS OF EMBODIMENTS

Embodiments of the present disclosure will now be described, by way of example only, with reference to the accompanying drawings. The following drawings are dedicated for description, and they are schematic and exemplary, being not drawn and precisely allocated in accordance with the actual ratio, thus not limiting the present disclosure. It is noted that, the term "connected in series" means "electrically connected in series" and "connected in parallel" means "electrically connected in parallel".

Figure 1:
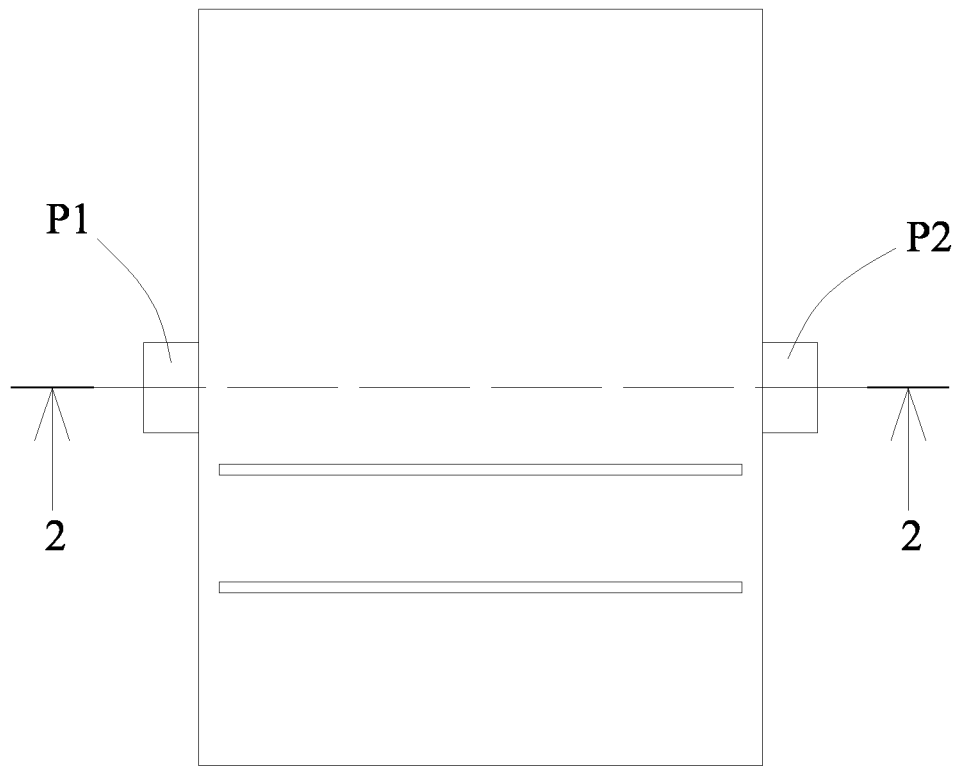
FIG. 1 is a front view diagram of a power storage device according to a first embodiment of the present disclosure.
Figure 2:
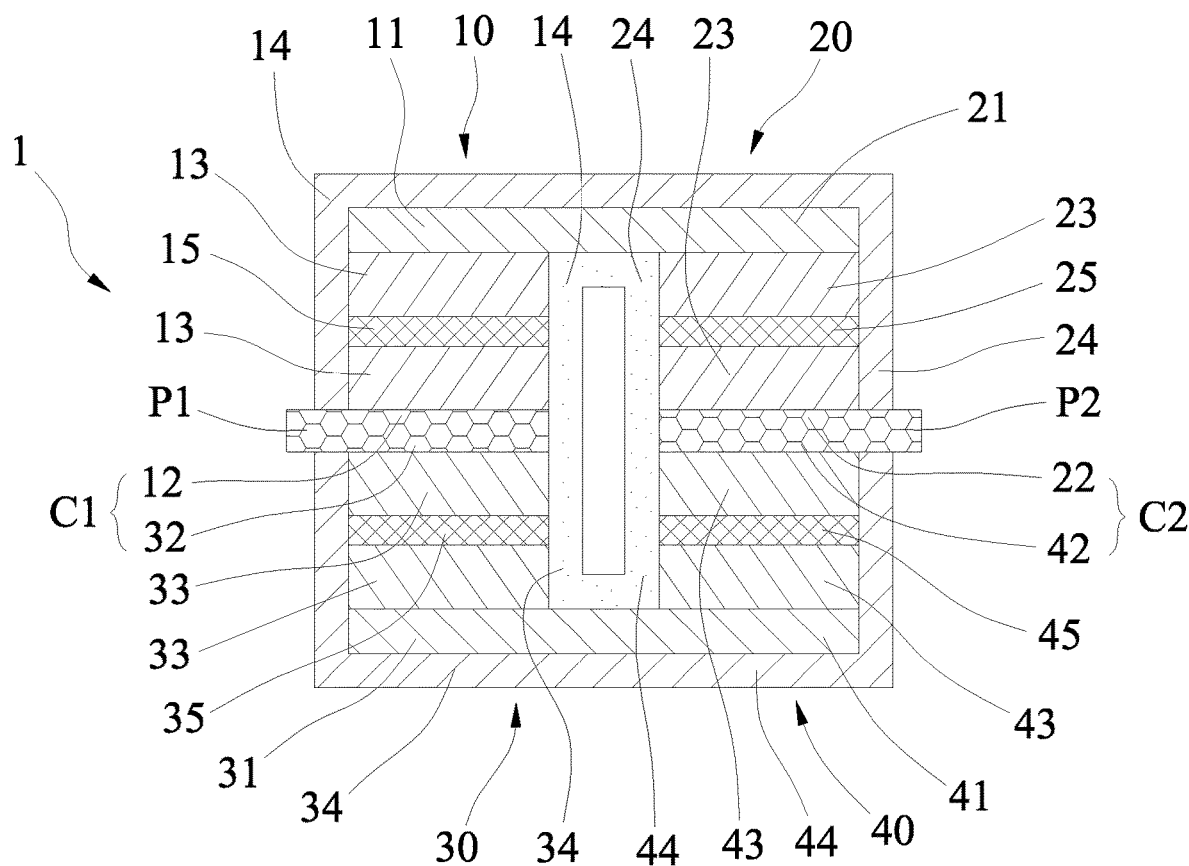
FIG. 2 is a sectional view diagram of the power storage device along the line 2 of FIG. 1.

Firstly, refer to FIG. 1 and FIG. 2, which show a power storage device of a first embodiment of the present disclosure, and the power storage device 1 comprises a first power storage unit 10, a second power storage unit 20, a third power storage unit 30 and a fourth power storage unit 40.

The first power storage unit 10 has a first electrode 11, a second electrode 12, first electrolyte layer 13 and a first encapsulation 14. The second electrode 12 is disposed opposite to the first electrode 11, the first electrolyte layer 13 is disposed between the first electrode 11 and the second electrode 12, and the first encapsulation 14 is used to encapsulate the first electrode 11, the second electrode 12 and the first electrolyte layer 13.

The second power storage unit 20 has a third electrode 21, a fourth electrode 22, a second electrolyte layer 23 and a second encapsulation 24. The fourth electrode 22 is disposed opposite to the third electrode 21, the second electrolyte layer 23 is disposed between the third electrode 21 and the fourth electrode 22, and the second encapsulation 24 is used to encapsulate the third electrode 21, the fourth electrode 22 and the second electrolyte layer 23.

The third power storage unit 30 has a fifth electrode 31, a sixth electrode 32, a third electrolyte layer 33 and a third encapsulation 34. The sixth electrode 32 is disposed opposite to the fifth electrode 31, the third electrolyte layer 33 is disposed between the fifth electrode 31 and the sixth electrode 32, and the third encapsulation 34 is used to encapsulate the fifth electrode 31, the sixth electrode 32 and the third electrolyte layer 33.

The fourth power storage unit 40 has a seventh electrode 41, an eighth electrode 42, a fourth electrolyte layer 43 and a fourth encapsulation 44. The eighth electrode 42 is disposed opposite to the seventh electrode 41, the fourth electrolyte layer 43 is disposed between the seventh electrode 41 and the eighth electrode 42, and the fourth encapsulation 44 is used to encapsulate the seventh electrode 41, the eighth electrode 42 and the fourth electrolyte layer 43.

The first electrode 11 and the third electrode 21 are integrated molding. The fifth electrode 31 and the seventh electrode 41 are integrated molding, the second electrode 12 and the sixth electrode 32 are integrated molding, and the fourth electrode 22 and the eighth electrode 42 are integrated molding. The second electrode 12 and the fourth electrode 22 are electrically insulated to each other. The first electrolyte layer 13, the second electrolyte layer 23, the third electrolyte layer 33 and the fourth electrolyte layer 43 are independent to each other, and do not contact each other. It is noted that, the term "integrated molding" mentioned above or below means "without assembly" and "made by a same process". For example, the sentence "the first electrode 11 and the third electrode 21 are integrated molding" means "the first electrode 11 and the third electrode 21 are a sheet of a preset shape (such as, a rectangular sheet) formed by cutting an electrode plate". Thus, the first electrode 11 and the third electrode 21 are a same electrode plate formed by a same cutting process, and thus have the integrity of integrated molding. The term "without assembly" means "the two electrode plates are not combined via welding, adhering or other attaching manner". For example, the first electrode 11 and the third electrode 21 are combination without welding metal or adhering conductive glue.

The power storage device 1 further has a first lead electrode P1 and a second lead electrode P2, the first lead electrode P1 and the second electrode 12 are electrically connected to each other, the second lead electrode P2 and the fourth electrode 22 are electrically connected to each other. Preferably, the first lead electrode P1 and the second electrode 12 are integrated molding, and the second lead electrode P2 and the fourth electrode 22 are integrated molding.

The first electrode 11, the second electrode 12, the third electrode 21, the fourth electrode 22, the fifth electrode 31, the sixth electrode 32, the seventh electrode 41, the eighth electrode 42, the first lead electrode P1 and the second lead electrode P2 are conductors composed of conductive materials, and they independently are metal foils, metal plates, metal meshes, activated carbon coated metal meshes, activated carbon coated metal plates, activated carbon coated metal foils, activated carbon clothes, activated carbon fibers, metal composite meshes, metal composite plates, transition metal oxide layers or plates made of transition metal oxides, or conductive polymer layers made of conductive polymers. Preferably, the aforementioned first electrode 11, the second electrode 12, the third electrode 21, the fourth electrode 22, the fifth electrode 31, the sixth electrode 32, the seventh electrode 41, the eighth electrode 42, the first lead electrode P1, and the second electrode 12 may be nickel metal foils. More preferably, the aforementioned first electrode 11, the second electrode 12, the third electrode 21, the fourth electrode 22, the fifth electrode 31, the sixth electrode 32, the seventh electrode 41, the eighth electrode 42, the first lead electrode P1 and the second electrode 12 may be nickel metal foils which surfaces are coated with activated carbons.

The first electrolyte layer 13, the second electrolyte layer 23, the third electrolyte layer 33 and the fourth electrolyte layer 43 are respectively made of aqueous electrolytes, and preferably are aqueous electrolyte layers. The aqueous electrolytes are, for example, aqueous solutions of lithium, sodium, potassium salts or any combination of the above.

The first encapsulation 14, the second encapsulation 24, the third encapsulation 34 and the fourth encapsulation 44 are respectively made of insulating materials, preferably, the insulating material with the characteristics of acid and alkali resistance, high waterproof and anti-gas penetration, for example, glue or thermosetting epoxy molding compound (EMC).

The interior of the aforementioned first electrolyte layer 13 can be provided with a first isolation film 15 with ion conduction function, the interior of the aforementioned second electrolyte layer 23 can be provided with a second isolation film 25 with ion conduction function, the interior of the aforementioned third electrolyte layer 33 can be provided with a third isolation film 35 with ion conduction function, and the interior of the aforementioned fourth electrolyte layer 43 can be provided with a fourth isolation film 45 with ion conduction function. The aforementioned first isolation film 15, the second isolation film 25, the third isolation film 35 and the fourth isolation film 45 can be cellulose films, single-layer or multi-layer polypropylene (PP) films, polyethylene (PE) films, polytetrafluoroethene (PTFE) membranes, polyvinylidene fluoride (PVDF) membranes or composite membranes of any combination of the above. It is noted that, when the electrolyte is a solid electrolyte or a spacer (spacer) is inserted, the first isolation film 15, the second isolation film 25, the third isolation film 35 and the fourth isolation film 45 can be omitted and not provided. Among them, the spacers are, for example, a plurality of ribs (ribs), which are arranged between the electrodes with a separating distance from the electrodes.

When the power storage device 1 of the foregoing first embodiment is charged with a direct current power source, the first lead electrode P1 is connected to one of the two opposite electrodes of the power source (for example, the negative electrode), and the second lead electrode P2 is connected to the other electrode of the two opposite electrodes of the power source (for example, the positive electrode) for charging. In this charging condition, the first lead electrode P1, the second electrode 12, the sixth electrode 32, the third electrode 21 and the seventh electrode 41 have the same electrode polarity (for example, negative polarity); the second lead electrode P2, the fourth electrode 22, the eighth electrode 42, the first electrode 11, and the fifth electrode 31 have the same other electrode polarity (for example, positive polarity). Further, the first lead electrode P1 (for example, the negative polarity) and the second lead electrode P2 (for example, the positive polarity) have different electrode polarities.

When the power storage device 1 of the foregoing first embodiment is connected to a load (such as, a light-emitting diode) for discharging, the first lead electrode P1, the second electrode 12, the sixth electrode 32, the third electrode 21 and the seventh electrode 41 have the same electrode polarity (for example, negative polarity), and the second lead electrode P2, the fourth electrode 22, the eighth electrode 42, the first electrode 11, and the fifth electrode 31 have the same other electrode polarity (for example, positive polarity). Further, the first lead electrode P1 (for example, negative polarity) and the second lead electrode P2 (for example, positive polarity) have different electrode polarities.

When the power storage device 1 of the foregoing first embodiment is charged or discharged, since the first electrode 11 of the first power storage unit 10 and the third electrode 21 of the second power storage unit 20 are integrated molding, the first power storage unit 10 and the second power storage unit 20 are connected in series, and since the fifth electrode 31 of the third power storage unit 30 and the seventh electrode 41 of the fourth power storage unit 40 are integrated molding, the third power storage unit 30 and the fourth power storage unit 40 are connected in series. Therefore, the power storage device 1 obtains a high potential through the aforementioned series connection. In particular, since the first electrode 11 and the third electrode 21 are integrated molding, and the fifth electrode 31 and the seventh electrode 41 are integrated molding, no additional welding is required for electrical connection when connecting them in series, so the welding process can be avoided, and the problem of increased impedance caused by welding can also be solved.

When the power storage device 1 of the foregoing first embodiment is charged or discharged, since the second electrode 12 of the first power storage unit 10 and the sixth electrode 32 of the third power storage unit 30 are integrated molding, the first power storage unit 10 and third power storage unit 30 are connected in parallel, and since the fourth electrode 22 of the second power storage unit 20 and the eighth electrode 42 of the fourth power storage unit 40 are integrated molding, the second power storage unit 20 and the fourth power storage unit 40 are connected in parallel. Therefore, the power storage device 1 achieves high capacitance through the aforementioned parallel connection. In particular, since the second electrode 12 and the sixth electrode 32 are integrated molding, and the fourth electrode 22 and the eighth electrode 42 are integrated molding, no additional welding is required for electrical connection when connecting them in parallel, so the welding process can be avoided, and the problem of increased impedance caused by welding can also be solved.

The first power storage unit 10, the second power storage unit 20, the third power storage unit 30 and the fourth power storage unit 40 of the power storage device 1 of the first embodiment do not require additional welding for electrical connection when they are connected in parallel and in series. Therefore, the problem that the overall impedance caused by the welding process increases due to welding can be avoided.

In particular, the first power storage unit 10, the second power storage unit 20, the third power storage unit 30, and the fourth power storage unit 40 can each independently be a supercapacitor. The first encapsulation 14, the second encapsulation 24, the third encapsulation 34, and the fourth encapsulation 44 are each independently insulated to the first electrode 11, the second electrode 12, the third electrode 21, the fourth electrode 22, the fifth electrode 31, the sixth electrode 32, the seventh electrode 41, and the eighth electrode, the first lead electrode P1 and the second lead electrode P2. For example, the first power storage unit 10, the second power storage unit 20, the third power storage unit 30 and the fourth power storage unit 40 each have A volts and B farads. Since the first power storage unit 10 and the second power storage unit 20 are connected in series, and the third power storage unit 30 and the fourth power storage unit 40 are connected in series, the power storage device 1 has a high potential of 2A volts. In addition, since the first power storage unit 10 is connected in parallel with the third power storage unit 30, and the second power storage unit 20 is connected in parallel with the fourth power storage unit 40, the power storage device 1 has a high capacitance of 2B farads. In addition, it is preferable that the first encapsulation 14, the second encapsulation 24, the third encapsulation 34, and the fourth encapsulation 44 are integrated molding, so the series and parallel connection of the first power storage unit 10, the second power storage unit 20, the third power storage unit 30 and the fourth power storage unit 40 can be formed inside the power storage device 1, and it is not necessary to perform series and parallel connection by welding externally.

In particular, the power storage device 1 has at least one common electrode. The common electrode mentioned and described later means that the same electrode plate is used to form a common electrode among at least two power storage units, and the top surface and the bottom surface of the common electrode are respectively formed with at least one storage unit. In other words, The top surface and the bottom surface of the common electrode can be used at the same time, instead of using only the top surface of the electrode or only the bottom surface of the electrode like the conventional electrode, the power storage device using the common electrode in the present disclosure can save electrode materials and make the overall thickness becomes thinner, therefore meeting the miniaturization of power storage devices. For example, in the first embodiment, the power storage device 1 has two common electrodes C1 and C2. Since the second electrode 12 of the first power storage unit 10 and the sixth electrode 32 of the third power storage unit 30 are integrated molding, in other words, the second electrode 12 and the sixth electrode 32 are the same electrode plate which forms the common electrode C1 of the first power storage unit 10 and the third power storage unit 30, and the upper and bottom surfaces of the common electrode C1 of the first power storage unit 10 and the third power storage unit 30 are respectively formed with the first power storage unit 10 and the third power storage unit 30. Further, the fourth electrode 22 of the second power storage unit 20 and the eighth electrode 42 of the fourth power storage unit 40 are integrated molding. In other words, the fourth electrode 22 and the eighth electrode 42 are the same electrode plate which forms the common electrode C2 of the second power storage unit 20 and the fourth power storage unit 40, and the upper and bottom surfaces of the common electrode C2 of the second power storage unit 20 and the fourth power storage unit 40 are respectively formed with the second power storage unit 20 and the fourth power storage unit 40.

Specifically, the four power storage units are divided into two groups, and the two power storage units in each group are connected in parallel. In the conventional method, there will be a total of four electrode surfaces that cannot be used to make the power storage units, which is wasteful, and the thickness of the formed power storage device is more than twice the thickness of the power storage unit (for example, two power storage units in each group are stacked up and down and connected in parallel). However, by adopting the manner of the common electrode of the present disclosure, the power storage units (the first power storage unit 10 and the third power storage unit 30) are respectively formed on the top surface and the bottom surface of the common electrode (for example, the common electrode C1), which is fully used without waste. The thickness of the common electrode is the thickness of a single electrode (the thickness of common electrode C1 in FIG. 2), so the thickness of the power storage device of the present disclosure is less than twice the thickness of the conventional power storage device, and it meets the miniaturization requirements.

Figure 3:
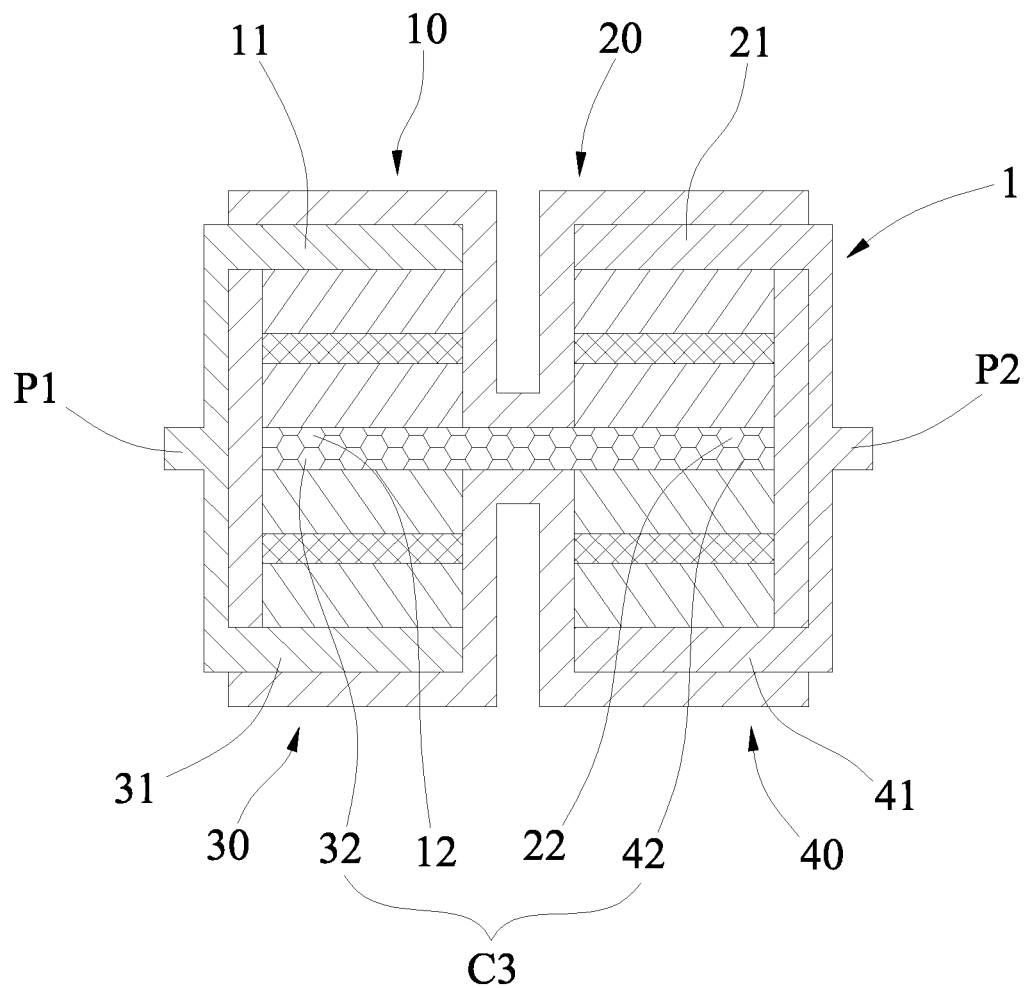
FIG. 3 is a structural diagram of a power storage device according to a second embodiment of the present disclosure.

Refer to FIG. 3, FIG. 3 shows the power storage device of a second embodiment of the present disclosure, the second embodiment is approximately similar to first embodiment, the similar parts will not be described again, and merely differences therebetween are described as follows. In the second embodiment, the second electrode 12, the fourth electrode 22, the sixth electrode 32 and the eighth electrode 42 of the power storage device 1 are integrated molding, the first electrode 11 and the second electrode 12 are electrically insulated to each other, and the fifth electrode 31 is electrically insulated from the seventh electrode 41, the first lead electrode P1, the first electrode 11 and the fifth electrode 31 are electrically connected to each other, and the second lead electrode P2, the third electrode 21 and the seventh electrode 41 are electrically connected to each other. Preferably, the first lead electrode P1, the first electrode 11 and the fifth electrode 31 are integrated molding, and the second lead electrode P2, the third electrode 21 and the seventh electrode 41 are integrated molding.

It is noted that, in the second embodiment, the power storage device 1 has a common electrode C3. Since the second electrode 12, the fourth electrode 22, the sixth electrode 32, and the eighth electrode 42 are integrated molding, in other words, the second electrode 12, the fourth electrode 22, the sixth electrode 32, and the eighth electrode 42 are the same electrode plate which forms the common electrode C3 of the first power storage unit 10, the second power storage unit 20, the third power storage unit 30 and the fourth power storage unit 40, a left end and a right end of the top surface of the common electrode C3 of the first power storage unit 10, the second power storage unit 20, the third power storage unit 30 and the fourth power storage unit 40 are formed with the first power storage unit 10 and the second power storage unit 20, and a left end and a right end of the bottom surface of the common electrode C3 of the first power storage unit 10, the second power storage unit 20, the third power storage unit 30 and the fourth power storage unit 40 are formed with the third power storage unit 30 and the fourth power storage unit 40. Therefore, the common electrode C3 is the common electrode of the first power storage unit 10, the second power storage unit 20, the third power storage unit 30 and the fourth power storage unit 40 at the same time. Compared with the conventional electrode that only the top surface of the electrode or only the bottom surface of the electrode is used, the power storage device 1 of the present disclosure can save more electrode materials and make the overall thickness thinner, and meets the miniaturization of the power storage device.

When the power storage device 1 of the foregoing second embodiment is charged or discharged, the first lead electrode P1, the first electrode 11, the fifth electrode 31, the fourth electrode 22 and the eighth electrode 42 have the same electrode polarity (for example, a negative polarity), and the second lead electrode P2, the third electrode 21, the seventh electrode 41, the second electrode 12 and the sixth electrode 32 have the same other electrode polarity (for example, positive polarity), wherein the first lead electrode P1 (for example, the negative polarity) and the second lead electrode P2 (for example, the positive polarity) have different electrode polarities. Since the second electrode 12 of the first power storage unit 10 and the fourth electrode 22 of the second power storage unit 20 are integrated molding, the first power storage unit 10 and the second power storage unit 20 are connected in series. Further, the sixth electrode 32 of the third power storage unit 30 and the eighth electrode 42 of the fourth power storage unit 40 are integrated molding, so the third power storage unit 30 and the fourth power storage unit 40 are connected in series. Therefore, the power storage device 1 with the above series connection can obtain high potential. Since the second electrode 12 of the first power storage unit 10 and the sixth electrode 32 of the third power storage unit 30 are integrated molding, the first power storage unit 10 and the third power storage unit 30 are connected in parallel. Further, the fourth electrode 22 of the second power storage unit 20 and the eighth electrode 42 of the fourth power storage unit 40 are integrated molding, so the second power storage unit 20 and the fourth power storage unit 40 are connected in parallel. Therefore, the power storage device 1 is provided by the aforementioned parallel connection can obtain high capacitance. In particular, since the second electrode 12, the sixth electrode 32, the fourth electrode 22 and the eighth electrode 42 are integrated molding, they can be connected in parallel and in series at the same time, and no additional welding is required for electrical connection, so welding can be avoided, and the problem that the overall impedance caused by the manufacturing process increases due to welding can be avoided. Therefore, the power storage device 1 can complete the series and parallel connection between the first power storage unit 10, the second power storage unit 20, the third power storage unit 30 and the fourth power storage unit 40 inside the power storage device 1, and it does not need to connect them in series and parallel externally by welding.

In the foregoing first and second embodiments, twos of the first power storage unit 10, the second power storage unit 20, the third power storage unit 30 and the fourth power storage unit 40 of the power storage device 1 are connected in series, and twos of the first power storage unit 10, the second power storage unit 20, the third power storage unit 30 and the fourth power storage unit 40 of the power storage device 1 are connected in parallel. If the first power storage unit 10, the second power storage unit 20, the third power storage unit 30 and the fourth power storage unit 40 all have the same potential and capacitance, the power storage device 1 has the potential of 2A volts and the capacitance of 2B farads.

Figure 4A:
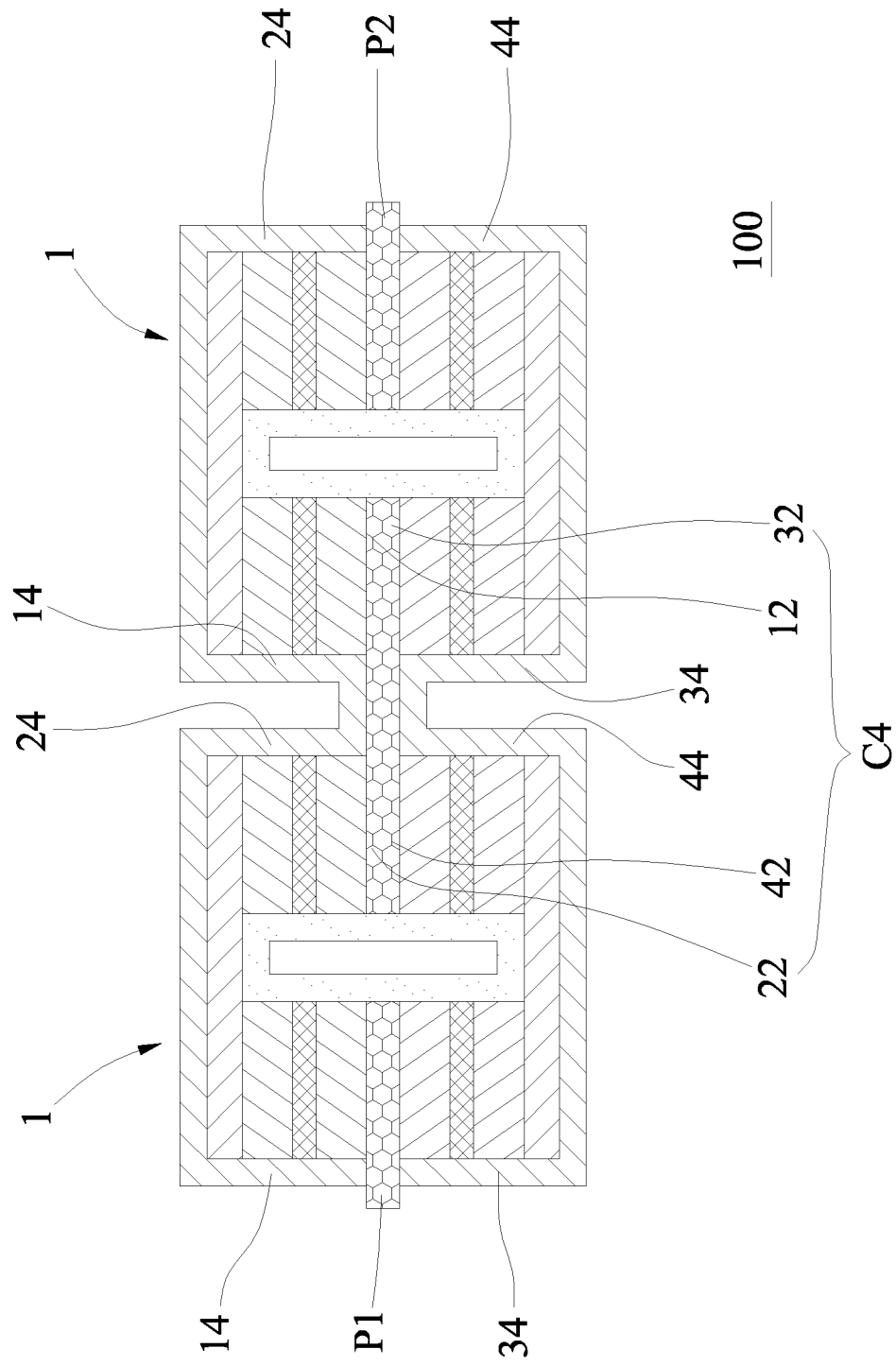
FIG. 4A is a structural diagram of a power storage device assembly structure having two power storage devices connected in series according to a third embodiment of the present disclosure.
Figure 4B:
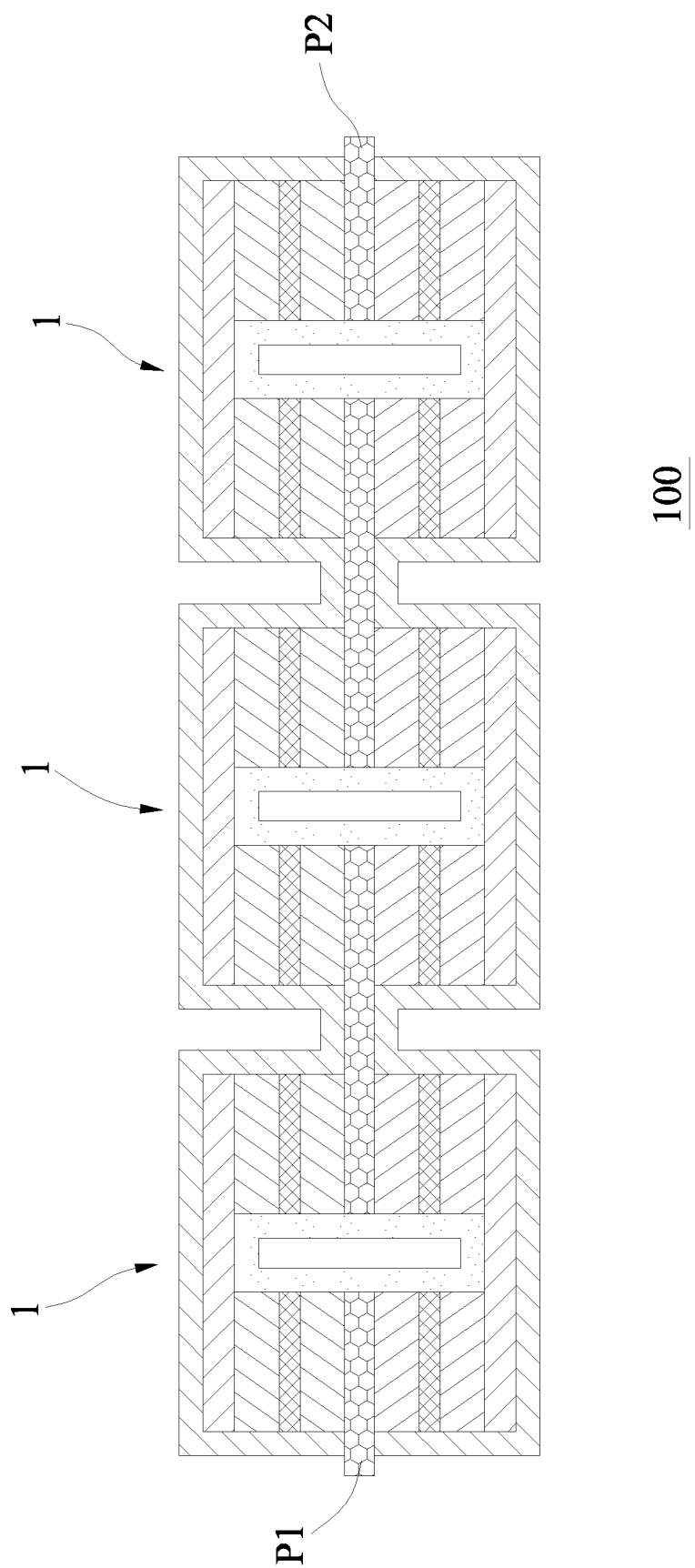
FIG. 4B is a structural diagram of a power storage device assembly structure having three power storage devices connected in series according to a third embodiment of the present disclosure.
Figure 4C:
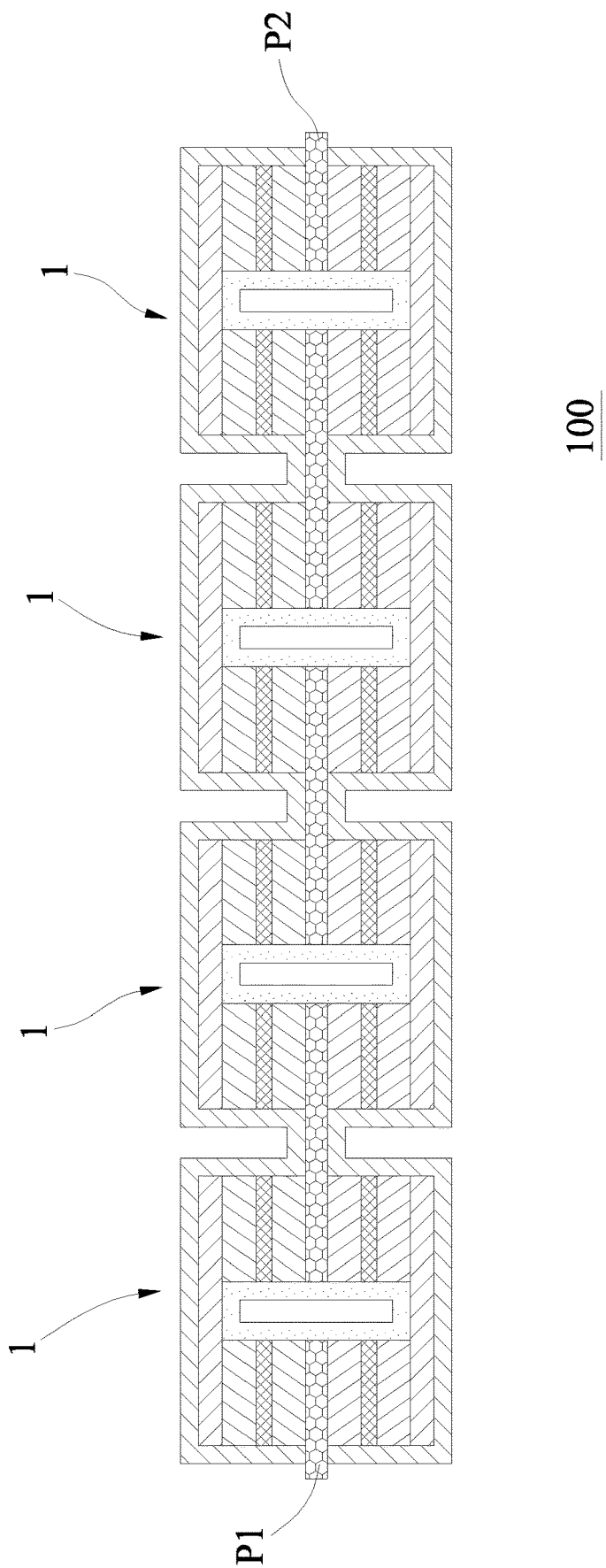
FIG. 4C is a structural diagram of a power storage device assembly structure having four power storage devices connected in series according to a third embodiment of the present disclosure.

Refer to FIG. 4A through FIG. 4C, which show a power storage device assembly structure of a third embodiment, and the present disclosure provides a power storage device assembly structure 100. The power storage device assembly structure 100 includes electrically connected power storage devices 1 described in the first embodiment, "the fourth electrode 22 and the eighth electrode 42 of one of the power storage devices 1" and "the second electrode 12 and the sixth electrode 32 of the adjacent other power storage device 1" are integrated molding. In other words, the fourth electrode 22 and the eighth electrode 42 of one of the power storage device 1 and the second electrode 12 and the sixth electrode 32 of the adjacent power storage device 1 are the same electrode plate which forms the common electrode C4 in two adjacent power storage devices 1 (refer to FIG. 4A). Therefore, in the third embodiment, the power storage devices 1 of the power storage device assembly structure 100 are arranged linearly, and the adjacent power storage devices 1 are connected in series to achieve a preset potential and capacitance. FIG. 4A shows two power storage devices 1 connected in series, so inside of the power storage device assembly structure 100 has a potential of 4A volts and a capacitance of 2B farads. FIG. 4B shows three power storage devices 1 connected in series, so inside of the power storage device assembly structure 100 has a potential of 6A volts and a capacitance of 2B farads. FIG. 4C shows four power storage devices 1 connected in series, so inside of the power storage device assembly structure 100 has a potential of 8A volts and a capacitance of 2B farads. Obviously, when the number of the power storage devices 1 connected in series increases, the saving effect of utilizing the upper surface and the lower surface of the common electrode is more significant.

Figure 5A:
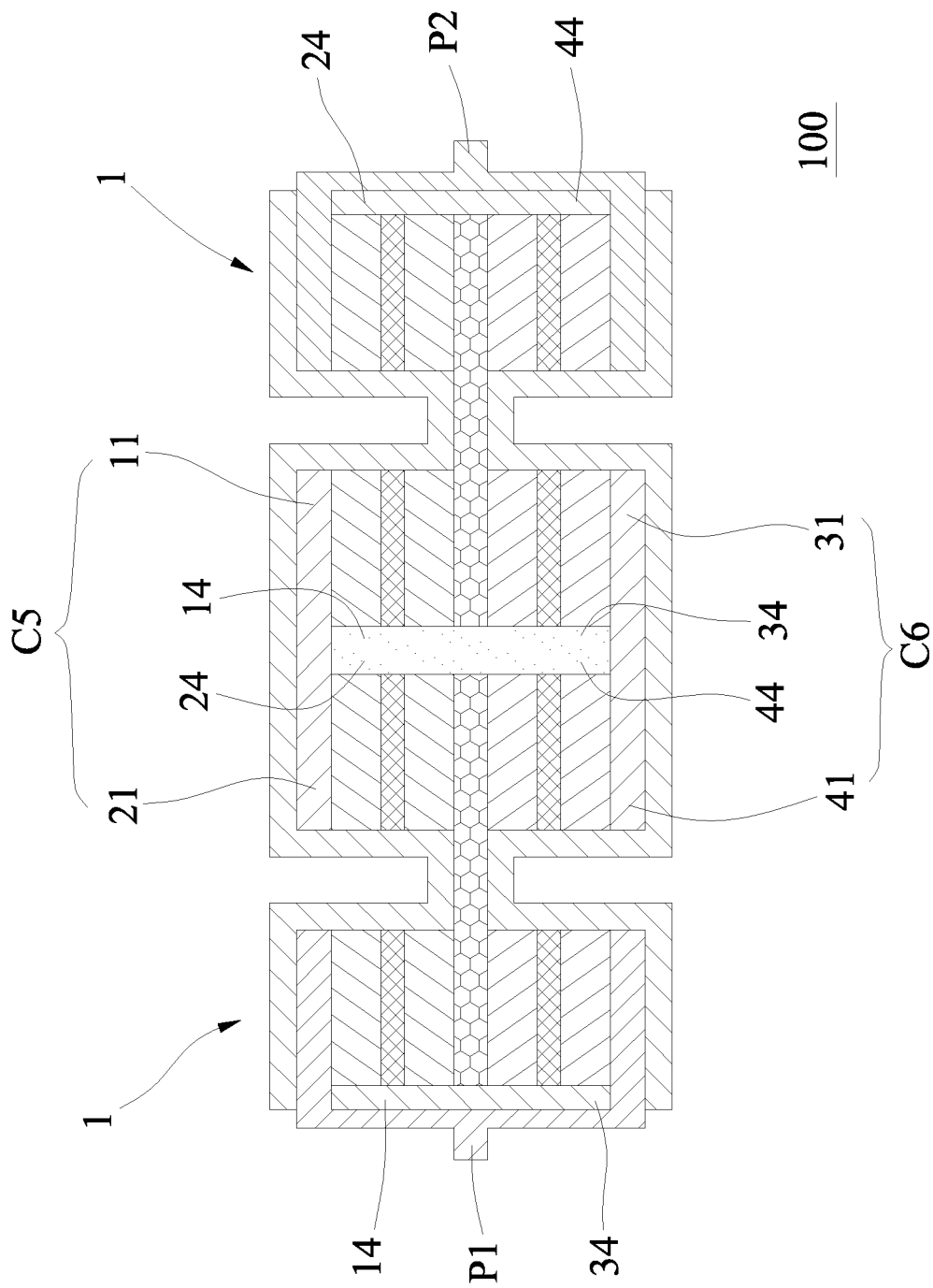
FIG. 5A is a structural diagram of a power storage device assembly structure having two power storage devices connected in series according to a fourth embodiment of the present disclosure.
Figure 5B:
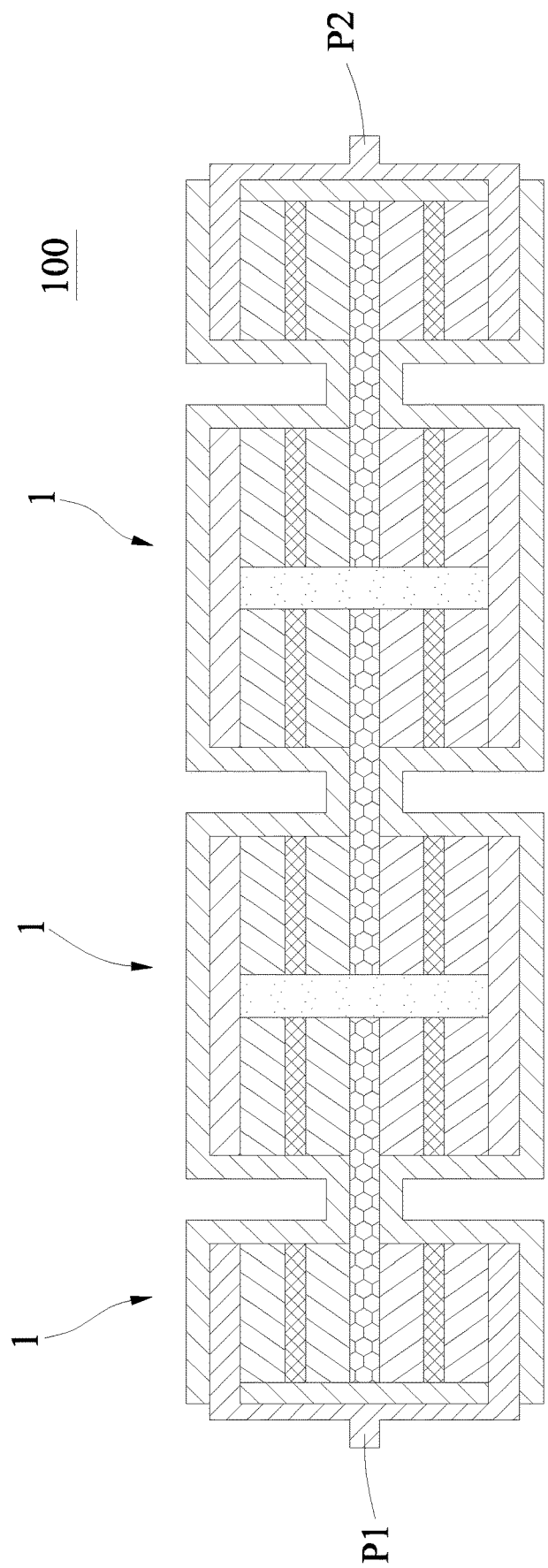
FIG. 5B is a structural diagram of a power storage device assembly structure having three power storage devices connected in series according to a fourth embodiment of the present disclosure.
Figure 5C:
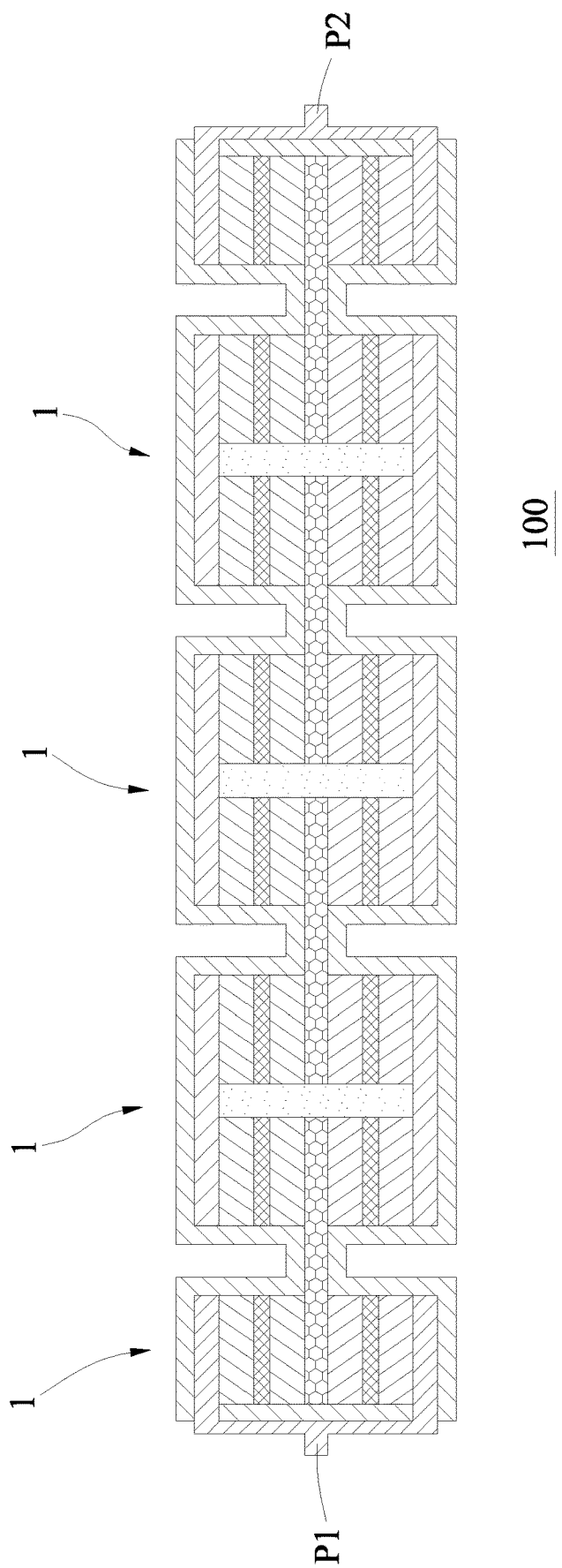
FIG. 5C is a structural diagram of a power storage device assembly structure having four power storage devices connected in series according to a fourth embodiment of the present disclosure.

Refer to FIG. 5A through FIG. 5C, which show a power storage device assembly structure of a fourth embodiment, and the present disclosure provides another one power storage device assembly structure 100. The power storage device assembly structure 100 includes electrically connected power storage devices 1 described in the second embodiment, and the power storage devices 1 are arranged linearly, and the adjacent power storage devices 1 are connected in series. The third electrode 21 of the power storage device 1 and the first electrode 11 of the adjacent power storage device 1 are integrated molding, and the seventh electrode 41 of the power storage device 1 and the fifth electrode 31 of the adjacent power storage device 1 are integrated molding. In other words, the third electrode 21 of the power storage device 1 and the first electrode 11 of the adjacent power storage device 1 are the same electrode plate which forms a common electrode C5 (see FIG. 5A) of the two adjacent power storage devices 1, and the seventh electrode 41 of the power storage device 1 and the fifth electrode 31 of the adjacent power storage device 1 are the same electrode plate which forms a common electrode C6 (see FIG. 5A) of the two adjacent power storage devices 1. Therefore, in the fourth embodiment, the adjacent power storage devices 1 of the power storage device assembly structure 100 and are connected in series to achieve a preset potential and capacitance. FIG. 5A shows two power storage devices 1 connected in series, so inside of the power storage device assembly structure 100 has a potential of 4A volts and a capacitance of 2B farads. FIG. 5B shows three power storage devices 1 connected in series, so inside of the power storage device assembly structure 100 has a potential of 6A volts and a capacitance of 2B farads. FIG. 5C shows four power storage devices 1 connected in series, so inside of the power storage device assembly structure 100 has a potential of 8A volts and a capacitance of 2B farads. Obviously, when the number of the power storage devices 1 connected in series increases, the saving effect of utilizing the upper surface and the lower surface of the common electrode is more significant.

According to the above embodiments, compared with the prior art and the product on the current market, the series and parallel connection of the first power storage unit, the second power storage unit, the third power storage unit and the fourth power storage unit can be formed inside the power storage device, and it is not necessary to perform series and parallel connection by welding externally. Thus, it can avoid the problem that the overall impedance caused by the welding process increases due to welding. In addition, in the present disclosure, the power storage devices can be connected in series within the power storage device assembly structure, and the preset potential and capacitance can be achieved. Moreover, the present disclosure uses a common electrode inside the power storage device, in which the top surface and the bottom surface of the common electrode can be used at the same time, instead of using only the top surface of the electrode or only the bottom surface of the electrode like the conventional electrode. Therefore, the power storage device adopting the common electrode of the present disclosure can save electrode materials and make the overall thickness thinner, and meet the miniaturization of the power storage device.

The power storage device and the power storage device assembly structure of the present disclosure are not anticipated by the prior art known by the inventors, and the Applicant believes they meet the specifications associated with the provisions of the patent law. Thus, the Applicant submits the application of the present disclosure to respectfully request a substantial examination for obtaining the patent right.

Although particular embodiments of the present disclosure have been described in detail for purposes of illustration, various modifications and enhancements may be made without departing from the spirit and scope of the present disclosure. Accordingly, the present disclosure is not to be limited except as by the appended claims.

The invention claimed is:

1. A power storage device, at least comprising:
    a first power storage unit having a first electrode, a second electrode, a first electrolyte layer and a first encapsulation, wherein the second electrode is disposed opposite to the first electrode, the first electrolyte layer is disposed between the first electrode and the second electrode, and the first encapsulation is used to encapsulate the first electrode, the second electrode and the first electrolyte layer;
    a second power storage unit having a third electrode, a fourth electrode, a second electrolyte layer and a second encapsulation, wherein the fourth electrode is disposed opposite to the third electrode, the second electrolyte layer is disposed between the third electrode and the fourth electrode, and the second encapsulation is used to encapsulate the third electrode, the fourth electrode and the second electrolyte layer;
    a third power storage unit having a fifth electrode, a sixth electrode, a third electrolyte layer and a third encapsulation, wherein the sixth electrode is disposed opposite to the fifth electrode, the third electrolyte layer is disposed between the fifth electrode and the sixth electrode, and the third encapsulation is used to encapsulate the fifth electrode, the sixth electrode and the third electrolyte layer; and
    a fourth power storage unit having a seventh electrode, an eighth electrode, a fourth electrolyte layer and a fourth encapsulation, wherein the eighth electrode is disposed opposite to the seventh electrode, the fourth electrolyte layer is disposed between the seventh electrode and the eighth electrode, and the fourth encapsulation is used to encapsulate the seventh electrode, the eighth electrode and the fourth electrolyte layer;
    wherein the first electrode and the third electrode are integrated molding, the fifth electrode and the seventh electrode are integrated molding, the second electrode and the sixth electrode are integrated molding, and the fourth electrode and the eighth electrode are integrated molding; the second electrode and the fourth electrode are electrically insulated to each other.

2. The power storage device of claim 1, wherein the second electrode and the sixth electrode are an electrode plate which forms a common electrode of the first power storage unit and the third power storage unit, and the first power storage unit and the third power storage unit are respectively formed on a top surface and a bottom surface of the common electrode of the first power storage unit and the third power storage unit.

3. The power storage device of claim 2, wherein the fourth electrode and the eighth electrode are another one electrode plate which forms a common electrode of the second power storage unit and the fourth power storage unit, and the second power storage unit and the fourth power storage unit are respectively formed on a top surface and a bottom surface of the common electrode of the second power storage unit and the fourth power storage unit.

4. The power storage device of claim 1, wherein the first encapsulation, the second encapsulation, the third encapsulation and the fourth encapsulation are respectively made of insulating materials.

5. The power storage device of claim 1, wherein the first electrolyte layer, the second electrolyte layer, the third electrolyte layer and the fourth electrolyte layer are respectively made of aqueous electrolytes.

6. The power storage device of claim 1, wherein the power storage device further has a first lead electrode and a second lead electrode, the first lead electrode and the second electrode are electrically connected to each other, the second lead electrode and the fourth electrode are electrically connected to each other; when the power storage device is charged or discharged, the first lead electrode, the second electrode, the sixth electrode, the third electrode and the seventh electrode have an identical electrode polarity, and the second lead electrode, the fourth electrode, the eighth electrode, the first electrode and the fifth electrode have other one identical electrode polarity; and the first lead electrode and the second lead electrode have the different electrode polarities.

7. The power storage device of claim 6, wherein the first lead electrode and the second electrode are integrated molding, and the second lead electrode and the fourth electrode are integrated molding.

8. A power storage device assembly structure, at least comprising power storage devices, and each of the power storage devices is the power storage device of claim 1, wherein the power storage devices are arranged linearly, and the adjacent power storage devices are connected in series; and the fourth electrode and the eighth electrode of the power storage device and the second electrode and the sixth electrode of the adjacent power storage device are integrated molding.

9. The power storage device assembly structure of claim 8, wherein the fourth electrode and the eighth electrode of the power storage device and the second electrode and the sixth electrode of the adjacent power storage device are an electrode plate which forms a common electrode of the two adjacent power storage devices.

10. A power storage device, at least comprising:
- a first power storage unit having a first electrode, a second electrode, a first electrolyte layer and a first encapsulation, wherein the second electrode is disposed opposite to the first electrode, the first electrolyte layer is disposed between the first electrode and the second electrode, and the first encapsulation is used to encapsulate the first electrode, the second electrode and the first electrolyte layer;
- a second power storage unit having a third electrode, a fourth electrode, a second electrolyte layer and a second encapsulation, wherein the fourth electrode is disposed opposite to the third electrode, the second electrolyte layer is disposed between the third electrode and the fourth electrode, and the second encapsulation is used to encapsulate the third electrode, the fourth electrode and the second electrolyte layer;
- a third power storage unit having a fifth electrode, a sixth electrode, a third electrolyte layer and a third encapsulation, wherein the sixth electrode is disposed opposite to the fifth electrode, the third electrolyte layer is disposed between the fifth electrode and the sixth electrode, and the third encapsulation is used to encapsulate the fifth electrode, the sixth electrode and the third electrolyte layer; and
- a fourth power storage unit having a seventh electrode, an eighth electrode, a fourth electrolyte layer and a fourth encapsulation, wherein the eighth electrode is disposed opposite to the seventh electrode, the fourth electrolyte layer is disposed between the seventh electrode and the eighth electrode, and the fourth encapsulation is used to encapsulate the seventh electrode, the eighth electrode and the fourth electrolyte layer;
- wherein the second electrode, the fourth electrode, the sixth electrode and the eighth electrode are integrated molding, the first electrode and the second electrode are electrically insulated to each other, and the fifth electrode and the seventh electrode are electrically insulated to each other.

11. The power storage device of claim 10, wherein the second electrode, the fourth electrode, the sixth electrode and the eighth electrode are an electrode plate which forms a common electrode of the first power storage unit, the second power storage unit, the third power storage unit and the fourth power storage unit, the first power storage unit and the second power storage unit are respectively formed on a left end and a right end of a top surface of the common electrode of the first power storage unit, the second power storage unit, the third power storage unit and the fourth power storage unit, and the third power storage unit and the fourth power storage unit are respectively formed on a left end and a right end of a bottom surface of the common electrode of the first power storage unit, the second power storage unit, the third power storage unit and the fourth power storage unit.

12. The power storage device of claim 10, wherein the first encapsulation, the second encapsulation, the third encapsulation and the fourth encapsulation are respectively made of insulating materials.

13. The power storage device of claim 10, wherein the first electrolyte layer, the second electrolyte layer, the third electrolyte layer and the fourth electrolyte layer are respectively made of aqueous electrolytes.

14. The power storage device of claim 10, wherein the power storage device further has a first lead electrode and a second lead electrode, the first lead electrode, the first electrode and the fifth electrode are electrically connected to each other, and the second lead electrode, the third electrode and the seventh electrode are electrically connected to each other; when the power storage device is charged or discharged, the first lead electrode, the first electrode, the fifth electrode, the fourth electrode and the eighth electrode have an identical electrode polarity, and the second lead electrode, the third electrode, the seventh electrode, the second electrode and the sixth electrode have other one identical electrode polarity; the first lead electrode and the second lead electrode have the different electrode polarities.

15. The power storage device of claim 14, wherein the first lead electrode, the first electrode and the fifth electrode are integrated molding, and the second lead electrode, the third electrode and the seventh electrode are integrated molding.

16. A power storage device assembly structure, at least comprising power storage devices, and each of the power storage devices is the power storage device of claim 10, wherein the power storage devices are arranged linearly, and the adjacent power storage devices are connected in series; and the third electrode of the power storage device and the first electrode of the adjacent power storage device are integrated molding, and the seventh electrode of the power storage device and the fifth electrode of the adjacent power storage device are integrated molding.

17. The power storage device assembly structure of claim 16, wherein the third electrode of the power storage device and the first electrode of the adjacent power storage device are an electrode plate which forms a common electrode of the two adjacent power storage devices, and the seventh electrode of the power storage device and the fifth electrode of the adjacent power storage device are another one electrode plate which forms another one common electrode of the two adjacent power storage devices.

* * * * *